(12) United States Patent
Gibart et al.

(10) Patent No.: US 8,046,588 B2
(45) Date of Patent: Oct. 25, 2011

(54) AUDIT TRAIL IN A PROGRAMMABLE SAFETY INSTRUMENTED SYSTEM VIA BIOMETRIC SIGNATURE(S)

(75) Inventors: Anthony G. Gibart, New Berlin, WI (US); James E. Dogul, Hudson, NH (US); Richard Galera, Nashua, NH (US); George E. Rollins, Chelmsford, MA (US); Derek W. Jones, Dumfries Galloway (GB); George K. Schuster, Royal Oak, MI (US); Suresh R. Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1019 days.

(21) Appl. No.: 11/360,182

(22) Filed: Feb. 23, 2006

(65) Prior Publication Data

US 2007/0199047 A1     Aug. 23, 2007

(51) Int. Cl.
    *G06F 21/00* (2006.01)
(52) U.S. Cl. .................. 713/186; 726/17; 707/784
(58) Field of Classification Search .................. None
    See application file for complete search history.

(56) References Cited

U.S. PATENT DOCUMENTS

| | | | | |
|---|---|---|---|---|
| 4,888,801 A * | 12/1989 | Foster et al. | | 380/277 |
| 5,712,973 A * | 1/1998 | Dayan et al. | | 726/36 |
| 5,790,674 A * | 8/1998 | Houvener et al. | | 713/185 |
| 6,256,737 B1 * | 7/2001 | Bianco et al. | | 713/186 |
| 6,272,506 B1 * | 8/2001 | Bell | | 715/255 |
| 6,496,595 B1 | 12/2002 | Puchek et al. | | |
| 6,498,861 B1 | 12/2002 | Hamid et al. | | |
| 6,927,671 B2 | 8/2005 | DeBono | | |
| 6,959,874 B2 | 11/2005 | Bardwell | | |
| 6,970,582 B2 | 11/2005 | Langley | | |
| 6,970,842 B1 * | 11/2005 | Ashby | | 705/38 |
| 7,210,164 B1 * | 4/2007 | Jandrell | | 726/2 |
| 7,409,398 B1 * | 8/2008 | Flam et al. | | 1/1 |
| 7,444,197 B2 * | 10/2008 | Popp | | 700/110 |
| 7,530,113 B2 * | 5/2009 | Braun | | 726/28 |
| 2002/0030582 A1 * | 3/2002 | Depp et al. | | 340/5.53 |
| 2002/0030584 A1 | 3/2002 | Perler et al. | | |
| 2002/0095587 A1 | 7/2002 | Doyle et al. | | |
| 2002/0158095 A1 | 10/2002 | Vor Keller et al. | | |
| 2002/0161594 A1 * | 10/2002 | Bryan et al. | | 705/1 |

(Continued)

OTHER PUBLICATIONS

International Search Report dated Feb. 23, 2007 for PCT Application No. PCT/US07/62748, 2 Pages.

*Primary Examiner* — Nathan Flynn
*Assistant Examiner* — Michael R Vaughan
(74) *Attorney, Agent, or Firm* — Turocy & Watson LLP; William R. Walbrun; John M. Miller

(57) ABSTRACT

System(s) and method(s) that facilitate utilizing biometric sensors (e.g., fingerprint, hand scan, voice recognition . . . ) in manufacturing systems in order to maintain accurate safety audit trails. A safety audit system, utilizing a biometric sensing device, facilitates determining if a user is allowed to access and change the configuration of the manufacturing system. Once a user is allowed to change the configuration (e.g., programmable electronics, tooling changes, software updates, etc.) the changes are automatically recorded in a safety audit database. Automatic storage of configuration changes mitigates manual recording of changes thereby enhancing the safety audit data often necessary to meet safety standards for manufacturing systems.

17 Claims, 13 Drawing Sheets

U.S. PATENT DOCUMENTS

| | | |
|---|---|---|
| 2002/0166062 A1* | 11/2002 | Helbig, Sr. .................... 713/200 |
| 2003/0051026 A1* | 3/2003 | Carter et al. .................. 709/224 |
| 2004/0005051 A1* | 1/2004 | Wheeler et al. ................. 380/28 |
| 2004/0039503 A1* | 2/2004 | Doyle ............................. 701/35 |
| 2004/0068690 A1* | 4/2004 | Wood ........................... 715/500 |
| 2004/0162987 A1* | 8/2004 | Doyle et al. .................. 713/186 |
| 2004/0230809 A1* | 11/2004 | Lowensohn et al. .......... 713/186 |
| 2004/0243260 A1 | 12/2004 | Law et al. |
| 2005/0137735 A1 | 6/2005 | Loy et al. |
| 2005/0160052 A1 | 7/2005 | Schneider et al. |
| 2005/0183143 A1* | 8/2005 | Anderholm et al. ............ 726/22 |
| 2005/0187677 A1 | 8/2005 | Walker |
| 2005/0192908 A1* | 9/2005 | Jorimann et al. ............... 705/67 |
| 2005/0216555 A1 | 9/2005 | English et al. |
| 2006/0026672 A1* | 2/2006 | Braun ............................... 726/9 |
| 2007/0050301 A1* | 3/2007 | Johnson ......................... 705/59 |

\* cited by examiner

AUDIT TRAIL IN A PROGRAMMABLE SAFETY INSTRUMENTED SYSTEM VIA BIOMETRIC SIGNATURE(S)

TECHNICAL FIELD

The subject innovation is related to systems and methods for employing biometric sensors and, more specifically to biometric sensors employed within safety instrumented manufacturing systems.

BACKGROUND

Companies are continuously developing systems and methods for managing hazards in manufacturing systems (MS) to ensure personnel safety and minimize equipment damage. Such is critical for companies that certify safety of manufacturing systems according to accepted standards. The need for safety is typically coupled with the necessity for innovative production approaches that allow companies to deliver low cost products with short production cycles. These approaches include automotive assembly, line efficiency, life science process, improved plant performance, varied consumer goods, supply chain improvements, etc. Safety is driven by legal requirements, industry codes, voluntary efforts, etc.

One approach for tracking changes is the creation of an internal company safety procedure. Company safety audit trails are often recorded for internal revision control, insurance requirements, ensuring worker safety, etc. The company can recognize the need for recording MS configuration changes and the individuals making those changes. Such configuration changes can be recorded in various ways, e.g., sending change notice e-mails, recording changes in a notebook, engineering change notices (ECNs), etc. However, using internal safety procedures results in company unique approaches, which are typically inflexible, and require cumbersome paperwork.

Still another approach is creating a safety audit trail defined by standards, which require recording of configuration changes. For example, two such safety systems standards include International Electrotechnical Commission (IEC) standard IEC-61508 and EN954-1. Safety standards are typically developed for systems by employing expertise and lessons learned involving previous fatalities, injuries and incidents or near misses. In general, IEC-61508 and EN954-1 require safety audits, which record configuration changes to the MS throughout the system's life. Safety auditing enables a company and/or equipment manufacturer to investigate configuration changes that contribute to accidents, and to mitigate such occurrences.

IEC-61508 is a standard for electrical, electronic and programmable electronic (PE) safety related systems, specifying requirements for how PE systems are to be designed, implemented, operated and maintained to meet required safety integrity levels (SIL). SILs are defined according to the risks involved in the specific system application. SIL 1 indicates that a failure's likely outcome is a non-emergency injury to persons and/or damage to equipment requiring non-extensive repairs, for example. Likewise, SIL 2 designates that a failure is prone to result in a serious injury necessitating emergency care and/or property damage requiring modest repair. SIL 3 indicates that a failure will have an expected outcome of life-threatening injuries to persons and/or damage to property requiring extensive repairs and/or prolonged shutdown of operations. Such requirements are defined with respect to programmable electronics, e.g., embedded controllers, microprocessors, programmable logic controllers (PLCs), software, etc.

Similarly, EN954-1 applies to electro-sensitive protective equipment (ESPE) and is a European harmonized standard. The standard requires that a machine's or manufacturing system's PE safety risk be assessed and a determination made to eliminate or reduce alleged risks. The safety risk is determined by three factors: 1) severity of the injury, 2) frequency and exposure time to the hazard, 3) possibility of avoiding the hazard. For example, Category 4 (Cat 4) requires the highest level for safety performance capable of accommodating the most hazardous conditions.

A manufacturing system that can employ IEC-61508 and EN954-1 certifications is a flexible manufacturing work-cell. Work-cells are typically designed to provide enhanced productivity, minimal downtime, a wide range of manufactured products, reduced costs to consumers, etc. Many work-cells integrate robots, machine tools, material handling equipment, packaging devices, sensors, actuators, controllers, other hardware and software. Safety standards and safety audit requirements for work-cells vary by industry; however machine safety audits are often performed in order to meet strict safety standards. Many companies conduct safety audits on manufacturing systems using software that creates sophisticated reminder systems, e.g., check lists for audits, inspection sheets, maintenance records, etc. However, there is in general no guarantee, e.g., that the paperwork will be filled out properly or that a required inspection is performed.

In addition, existing highly automated and sophisticated manufacturing systems are not without deficiencies with respect to tracking commissioning, configuration changes, safety audits, etc. In particular, conventional manufacturing systems are complex in nature, including sensors, actuators, material handling equipment, machine tools, versions of software, various software configurations, multiple maintenance personnel, etc. In many manufacturing systems, the versions of software have typically changed numerous times, and multiple users have accessed the system to change the software or hardware configurations, sometimes without proper tracking and authorization.

Even when the MS requires a password to gain access, the passwords can be shared, compromised, forgotten, and the like. Similarly, if the system requires a key, access card or badge, such items can be stolen, duplicated, lost, forgotten, etc. Additionally, once a user has gained access to the MS, it is possible that the user fails to record the configuration changes made, and so if there is a safety issue it is difficult or impossible to determine the configuration of the manufacturing system at the time of the incident.

Furthermore, in environments requiring safety audits, for example, SIL 3, CAT 4 or others, it is cumbersome to provide a safety audit report, since various users of the manufacturing system fail to keep adequate records. As explained earlier, with larger MS, it becomes more difficult to establish a safety audit database and in many cases the database is untrustworthy. In other words, even if a safety audit system is in place it may have only captured a small percentage of the configuration changes made to the MS.

Moreover, employing programmable electronics can also create new hazards and/or exacerbate existing hazards. It is anticipated that fatalities, injuries, and near misses will increase as the number and complexity of programmable electronics increases with the need to remain competitive. It is critical that safety systems evolve along with programmable electronics in order to reduce safety issues. Moreover, cooperation of a user is typically required to record the configuration changes electronically using a PDA, laptop computer or computing device, and for the change record to be stored in a database. As the user makes configuration changes to the MS the user is required by the company to record those changes electronically. Again it incumbent on the user to record and changes so that an accurate safety audit trail is established. If the user fails to record the change to the system the database is incomplete.

Therefore, there is a need to overcome the aforementioned exemplary deficiencies associated with conventional systems and devices.

SUMMARY

The following presents a simplified summary of the subject innovation in order to provide a basic understanding of some embodiments described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation provides for systems and methods that facilitate employment of biometric sensors (e.g., retinal scan and/or voice recognition, and the like) in a safety audit system, for recording and/or tracking configuration changes to a manufacturing system of a safety audit database. According to one aspect of the subject innovation, a sensor identification component (SIC) determines whether users are authorized to work on the manufacturing system (MS), and automatically initiates the creation and maintenance of the safety audit database for any work performed e.g., on the MS, any software installed, software that has been modified, hardware changes, etc. Accordingly, a safety audit database for the MS is kept automatically, and hence typical requirements for completing checklists and inspection forms, maintaining inspection records, and the like are mitigated.

Such SIC can further communicate identifying indicia of users to a safety system component (SSC) to verify if users are actually authorized to work on the MS. Biometric sensors within the SIC can facilitate reading and/or recording various biometric data of users who desire to access the manufacturing system to perform configuration changes. Sensors associated with the SIC can employ fingerprint scan, iris scan, vein scan, voice recognition, and the like, to collect biometric data. The safety system component can include software and/or hardware having inputs and/or outputs that can compare biometric sensor data, e.g., a fingerprint of a potential user with fingerprints of authorized users such as actual digital files representing fingerprints. The safety system component can subsequently determine if the user is authorized to change the configuration of the manufacturing system.

According to a further aspect of the subject innovation, the safety audit database (SAD) can be automatically updated when an authorized user changes the configuration of the manufacturing system. Hence, the subject innovation can record initial setup, configuration changes, versions of software, inspections, maintenance performed, tool changes, and the like, to create a trustworthy safety audit database that can potentially result in a safer working environment. The SSC can also facilitate tracking of unauthorized users that have attempted to gain access to manufacturing systems by recording the unauthorized users' biometric data and alerting management of a potential problem, if desired.

In accordance with another aspect of the innovation described herein, the safety system component can employ a lock component (LC) to control access to the manufacturing system. If the safety system component verifies and validates the biometrics of the user, the LC "unlocks" the manufacturing system and allows the user access, (e.g., similar to a user gaining access to a computer with a password.) On the other hand, if an unauthorized user attempts to work on the manufacturing system when locked, the system can shut down, and an e-mail can be sent to management or an alarm activated for example. Once the user has been authorized and has gained access to the manufacturing system, the safety system component automatically records any configuration changes (e.g., changes to controllers, processors, actuators, sensors, etc.) in the safety audit database as part of the company's on-going revision control system.

The safety system can record: the identity of the persons making the changes, the date of the changes, type of configuration changes, and the like. Configuration changes can be recorded via a record of changes that are available to the company that purchased or rents the equipment. In addition, changes can be recorded so that they are in general only available to suppliers/manufacturers of the equipment, in the event that a representative of the company alters the safety audit database after an incident or accident has occurred, (e.g., a record of any "after the fact alterations").

Other data, such as tool position, robot arm velocity, welding temperatures, tool replacements, assembly speeds, etc., can be recorded in the SAD that is internal to the safety system component as well as in an external database. Tool changes can be tracked utilizing RFID tagged tools and when the tool is changed, then the associated RFID tag is read and input to the SSC and stored in the SAD. Robotic arm movements can also be recorded using position sensors and accelerometers with the data fed to the SSC and stored in the SAD. According to yet another aspect of the subject innovation, the safety system component can store authorized users' biometric data in a storage component (SC) within e.g., a portable PC (laptop computer), a human machine interface (HMI), a desktop computer, a PDA, and the like.

The storage component (SC) can convert the various biometric data that are input into the safety system component as digital files, for later use as needed. Associated software can analyze the biometric characteristic and translate it into a graph or code as digital data, for example. The data can be stored in associated files, such as, the authorized users' name, biometric digital files (e.g., fingerprint data, iris scan data, DNA data), areas of the manufacturing system the users are allowed to work on, the users' employee number, and the like, wherein the physical characteristic can be translated into computer code or a graph (e.g., recording as much data as is deemed necessary). The computer code or graph can be used for comparing data of the user attempting to gain access, to authorized users' data.

In a related aspect an analysis component (AC) within the SSC can compare the biometric data of the user who attempts to gain access to a specific area of MS (e.g., robotic welding area), with a database of authorized users to confirm whether the user is authorized to work on that area of the MS. For example, an authorized user can be allowed to work on software configuration changes, but not be allowed to change hardware components (e.g., microprocessors, embedded controllers, programmable logic controllers).

The safety system can track items such as: the users' certifications, what areas of the MS the users are allowed to work on, deny access to work on specific areas of the MS, remind the users that recertification is due, etc. Once the user is granted access to work on a particular area of the MS, then the performed changes are recorded automatically by the safety system component within the SAD. For instance, the internal database within the safety audit database can store information such as, but not limited to, configuration change history, replaced components, out of service information, the date, the authorized user's name, etc.

Moreover, the sensor identification component can itself contain multiple sensors, e.g., iris scan, retina scan, fingerprint, deep tissue scan, etc., wherein the user to be identified has multiple biometric data initially recorded, and subsequently compared to the biometric data in the authorized users' database. Multiple sensors can be employed when security is a critical issue and there is a concern that users might attempt to bypass or fool the system to gain access or when the manufacturing equipment is expensive, such as, aerospace satellite manufacturing equipment or aircraft engine MS. For these applications, the sensor identification component can use more unique sensor technology, e.g., voice recognition, vein scans, iris scan, etc., as a person's irises, voice and veins are difficult to falsify. Veins, for example, are often not visible through the skin, which makes them difficult to counterfeit and vein shape changes little with age. The SIC can contain a wide range of interchangeable sensors that can be adapted for various manufacturing conditions. In a related aspect, the safety system component can compare the biometric data of the user attempting to gain access to the manufacturing system with authorized users' biometric data stored in an external database. The external data base can allow a larger amount of data to be stored externally to the SIC computer. The biometric sensor data can potentially be stored as large data files so that large companies can maintain large numbers of authorized users' biometrics stored in a single database.

Moreover, the data can also be shared across a network between different company locations and be stored in multiple external databases. Such biometric data can be encrypted to protect the data and make the communications secure. The data can be shared employing a variety of mediums, the Internet, wireless, infra-red, Blue-tooth, ultra-wide band, satellite, etc. The following description and the annexed drawings set forth in detail certain illustrative embodiments of the claimed subject matter. These embodiments are indicative, however, of but a few of the various ways in which the principles of the innovation may be employed and the claimed subject matter is intended to include all such embodiments and their equivalents. Other advantages and novel features of the claimed subject matter will become apparent from the following detailed description of the innovation when considered in conjunction with the drawings. To the accomplishment of the foregoing and related ends, certain illustrative embodiments of the claimed subject matter are described herein in connection with the following description and the annexed drawings.

These embodiments are indicative, however, of but a few of the various ways in which the principles of the claimed subject matter can be employed and such subject matter is intended to include all such embodiments and their equivalents. Other advantages and novel features will become apparent from the following detailed description of the invention when considered in conjunction with the drawings.

DETAILED DESCRIPTION

Figure 1:
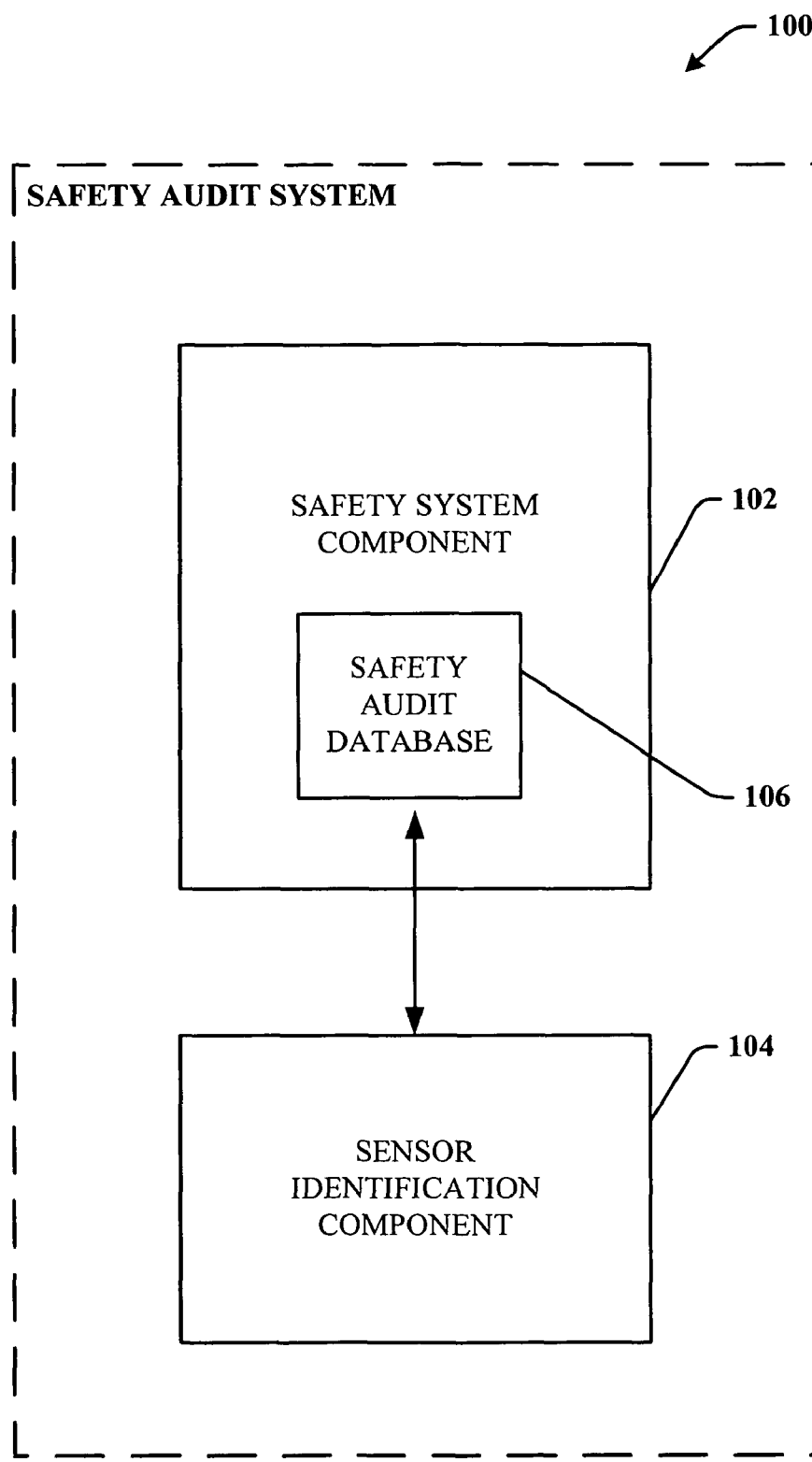
FIG. 1 illustrates a block diagram of an exemplary system that facilitates utilizing an identification sensor with a manufacturing safety system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any embodiment or design described herein as "exemplary" is not necessarily to be construed as preferred or advantageous over other embodiments or designs.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, embodiments of the claimed subject matter may be implemented as a method, apparatus, or article of manufacture using standard programming and/or engineering techniques to produce software, firmware, hardware, or any combination thereof to control a computer to implement various embodiments of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a safety audit system 100 that can be employed in connection with a safety related control system when a user or operator changes the configuration of a manufacturing system within an industrial, automotive, aerospace environment, etc. The safety audit system 100 can employ a safety system component 102 that interacts with a sensor identification component 104. A safety audit database 106 within the safety system component 102 records the changes in the manufacturing system. The safety system component 102 can facilitate identifying authorized individuals that can interact with the machinery and reconfigure the machine or manufacturing system. The safety system component 102 can interact with the sensor identification component 104, and can determine whether the individual who desires to change the machine or manufacturing system configuration is on the authorized list, for example. And if so, whether the new configuration is allowed, wherein any configuration change can be automatically recorded in the safety audit database 106 along with other defined parameters, etc. In addition, other information such as; identification data associated with the user making the changes, the date of the changes, the tools changed out, etc., can be recorded.

For example, the sensor identification component 104 can employ a fingerprint sensor that reads the user's fingerprint. If the user's fingerprint does not match a print in the database of authorizes users, the user will not be allowed access to the machine or to change the machine's configuration. Moreover, the safety system component 102 can be associated with a large database of fingerprints (not shown) that contain the fingerprints of all the service representatives from the company who are permitted to reconfigure a particular manufacturing system. The safety system component 102 can therefore not only record configuration changes in the safety audit database 106 but can also "lock out" individuals from the manufacturing system who are not authorized to re-configure the equipment. Additionally, passwords can be required along with biometric sensor or sensor identification if desired for additional security. It is to be appreciated that the sensor identification component 104 can employ various biometric sensors (not shown). Such biometric or other sensors can include fingerprint sensor, retinal scan, iris scan, voice recognition, embedded RFID, DNA, hair analysis, face recognition, optical skin measurements or any other unique human identifying sensor, for example.

The safety audit system 100 can be employed with a single biometric sensor, thereby reducing size, complexity and/or expense associated with the sensor identification component 104. Additionally or alternatively, multiple biometric sensors can be employed within the sensor identification component 104. Particular biometric sensors employed within the sensor identification component 104 can vary depending upon environment or desired implementation of the safety audit system 100. Furthermore, it is apparent that the safety audit system 100 can employ more than one biometric sensor in connection with increasing reliability of the system 100 and a potential higher probability of correctly identifying an authorized user. For instance, several fingerprint sensors can be employed in the safety system component 102, which then can be compared probabilistically to determine the probability of the user being an authorized user (who can change the configuration of the equipment).

In one exemplary aspect of the subject innovation, unauthorized users that attempt to change the configuration of the equipment, more than a predetermined number of times, can have the associated biometric data stored in the safety audit database 106 and sent to management along with the number of times the unauthorized user tried to enter the system. Moreover, the safety system component 102, can shut down the MS, after a predetermined number of failed attempts, and require a supervisor to restart the system. For instance, a machine or portion thereof can be powered down upon reaching a threshold number of attempts to access the machine by an unauthorized user. Additionally, alarms can be generated (either audible or visual) in areas where classified work is being done or there is risk of sabotage or the like. It is to be appreciated that changes to the MS can employ changes to programmable electronics, e.g., loading new versions of software, re-programming software, replacing plug and play controllers, changing safety sensors, etc. The manufacturing system can employ various programmable electronic approaches, e.g., embedded PE, networked PE, non-networked programmable electronics, etc.

It is to be appreciated that the subject innovation can also employ various artificial intelligence based schemes for automatically carrying out various automated functionality described herein. Accordingly, any suitable component or act discussed herein can optionally employ artificial intelligence (AI) in connection with facilitation of carrying out a subset of functionality associated therewith. For example, inferring minimum amount of biometric data to identify authorized users and the amount thereof to be stored can be facilitated via an automatic classifier system and/or process.

A classifier is a function for example that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed (e.g., pre-storing of data). In the case of pre-storing information to unallocated memory space, for example, attributes can be file types or other data-specific attributes derived from the file types and/or contents, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is employed to develop models of priority.

As will be readily appreciated from the subject specification, the invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative embodiments whereby based upon a learned or predicted user intention, the system can prompt users to validate authorization using biometric sensors within the sensor identification component 104 with the least degraded performance. Likewise, an optional AI component can remove authorized user data to increase the amount of memory in the safety system component 102. The data to be removed from the safety system component 102 can be determined by the AI component without supervisor interaction.

Figure 2:
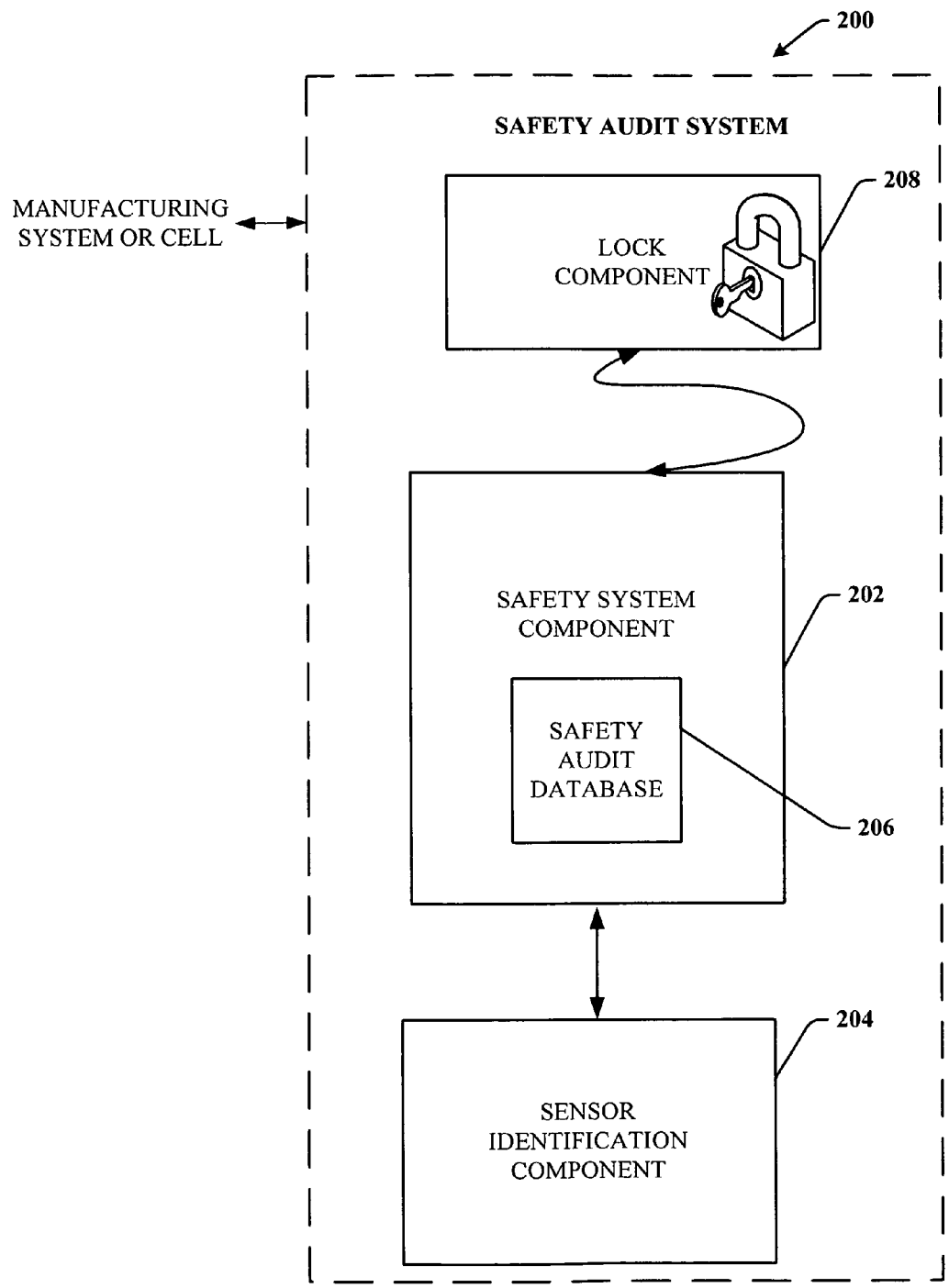
FIG. 2 illustrates a block diagram of an exemplary system that facilitates selecting whether a user is allowed access to a manufacturing system.

Referring now to FIG. 2, a safety audit system 200 that can be employed in connection with one or more manufacturing systems is illustrated. The safety audit system 200 employs a lock component 208 that can either allow or prevent a user from accessing and changing the configuration of a manufacturing system. The manufacturing system or cell can include a single machine, equipment, a manufacturing cell, an assembly line, several machines integrated together, and the like. The safety system component (SSC) 202 can be employed to direct the lock component 208 to allow or deny access to the manufacturing system. For instance, at a first point in time the sensor identification component 204 can sense a biometric, e.g., iris scan, signature, voice recognition, etc. and can communicate the biometric to the safety system component 202, at a second point in time the SSC 202 can be employed to determine if the user is an authorized user, and if authorized the SSC 202 can communicate with the lock component 208 allowing the user to change the configuration of the manufacturing system. Any changes to the MS can be recorded in the safety audit database 206. Thus, it is understood that the safety audit database 206 can store data that is often stored manually, e.g., maintenance records, repair records, hardware change-outs, detected faults, emergency stops activated, etc. For instance, the safety audit database 206 can be downloaded or backed up on a regular basis to ensure ready access to the safety audit data. Furthermore, while for ease of explanation the safety audit database 206 is described as recording all of the changes to the MS configuration, any suitable combination of automatic and manual recording of data is contemplated and intended to fall under the scope of the hereto-appended claims. As explained earlier, one or more of the sensors can be biometric sensors; however, any suitable sensor or combination of sensors are contemplated and intended to fall under the scope of the hereto-appended claims, e.g., RFID, barcode readers, magnetic strip, etc.

The lock component 208 can be associated with the manufacturing system (MS) to facilitate allowing authorized individual(s) to access the MS. For instance, light curtains with alarms, gated access equipped with electrical interlocks, motion sensors with MS shutdown, etc., can be employed in connection with the lock component 208 in order to prevent unauthorized access to the MS. A plurality of optical detectors (not shown) can be coupled to control circuitry, which can cause a machine or set of machines to shut down if an individual obstructs a threshold number of beams of light. As suggested above, one or more authorized users can change the configuration of the system at a given time, however, any suitable sensors or combination of sensors are contemplated and can be located at various locations within the MS to determine various users and are intended to fall under the scope of the hereto-appended claims.

The safety audit system 200 enables automatic tracking and recording information associated with individuals performing configuration changes on the manufacturing systems. Furthermore, while the lock component 208 is shown, it is understood that such a lock component 208 may be optional, as the safety system component 202 can record the user changing the configuration of the MS and if an unauthorized change is made, e.g., an alarm can be activated, the MS can then shut down, and an e-mail sent to notify management, etc. In operation, the safety audit data can be provided to the safety audit database 206 from the safety system component 202 and thereafter supplied to the safety team, consultants, management, the MS supervisor, etc. Faults detected in the safety system component 202 can be transformed into electrical signals that can be analyzed to initiate warnings such as alarm activation, system shutdown, rescue team notification, and the like. Such events can also be recorded in the safety audit database 206 and once the memory capacity reaches a predetermined capacity, the data can subsequently be downloaded, and the database can be backed up.

Figure 3:
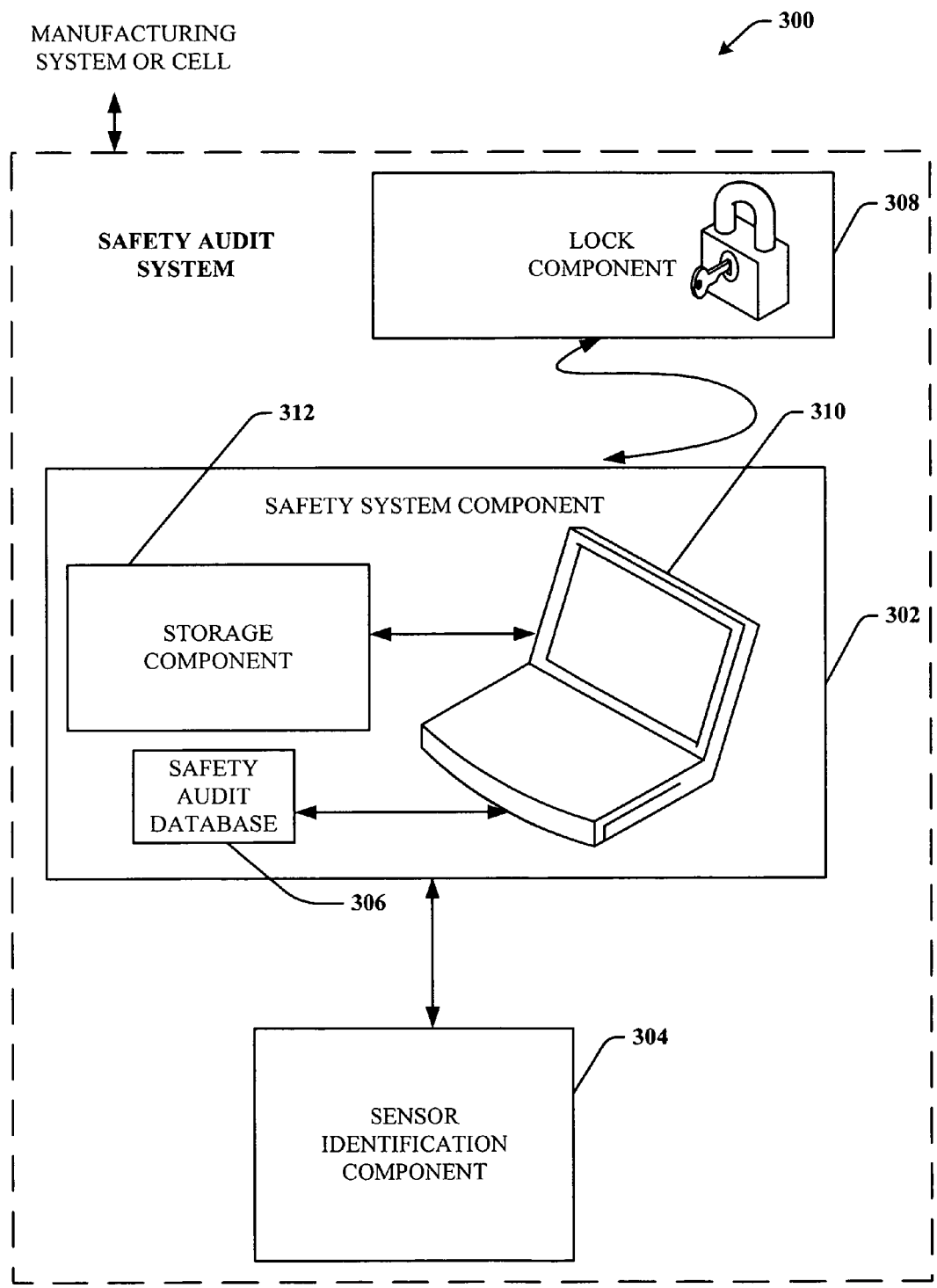
FIG. 3 is a block diagram that illustrates a system that facilitates storing of multiple users' biometric data in accordance with an exemplary aspect of the subject innovation.

Now referring to FIG. 3, a safety audit system 300 is illustrated that can be employed in an industrial or manufacturing environment. The safety audit system 300 employs a safety system component 302 and a sensor identification component 304, which reads biometric data. Biometric data related to a user can then be directed to a computing device 310, where the data can be compared to a database of authorized users that is stored in a storage component 312, those users are allowed to change the configuration of the manufacturing system with changes recorded in the safety audit database 306.

The computing device 310 can be a laptop computer that contains a storage component 312 such as a hard drive that contains a database of biometrics of all authorized users that are allowed to work on the MS. For example, the biometric sensor can be a voice recognition sensor that records the sound patterns of a user and the safety system component 302 compares the sound pattern of the user to the patterns logged in the storage component 312. Once an authorized user is allowed to work on the system, any changes to the configuration can be recorded in the safety audit database 306 for retrieval in case of events such as an accident, a MS shutdown, a number of faults above a pre-defined threshold, a power outage, voltage spikes, and the like, for example. Moreover, the configuration changes can be sent directly to an external database or sent via e-mail to management.

Figure 4:
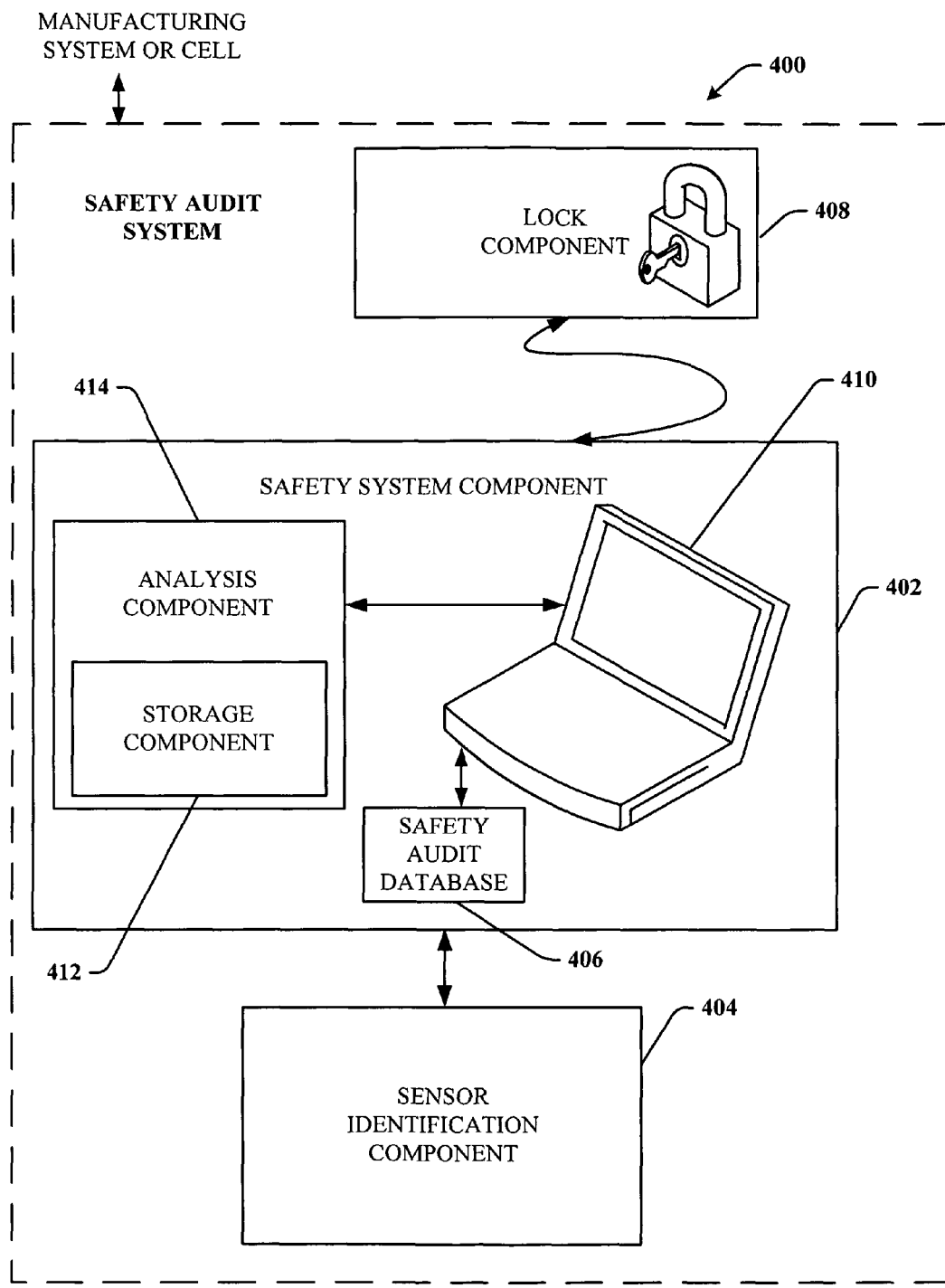
FIG. 4 illustrates a block diagram of an exemplary system that facilitates analyzing users for authorization within a manufacturing safety system.

Referring now to FIG. 4, a safety audit system 400 for employment within a manufacturing system is illustrated. The safety audit system 400 can incorporate a safety system component 402 that is in communication with a sensor identification component 404, which can be employed to read the biometric data. The safety system component 402 can receive data from sensor identification component 404 utilizing a variety of mediums, hard-wire, the Internet, a hard-wire network connection, wireless, infra-red, Blue-tooth, ultra-wide band, satellite, etc. Biometric data of a user can then be sent to a computing device 410 where the data can be compared to an authorized users' database stored in a storage component 412, containing those users that are allowed to change the configuration of the manufacturing system with changes recorded in a safety audit database 406. The biometric data associated with the user attempting to gain access to the MS can be analyzed utilizing an analysis component 414, which compares the user data with the authorized users' data in the storage component 412. The analysis component 414 can be employed to convert biometric data into electrical signals (either digital and or analog). The analysis component 414 can provide similarity measurements or numerical scores, employing various algorithms that indicate a similarity between pairs of biometrics data. The two basic ways that the analysis component 414 can work is one-to-one analysis or one-to-many analysis. In one-to-one analysis an identifier e.g., an employee ID number is provided to the system and it verifies that the employee's provided biometric data matches the biometric data stored under that identifier. Regarding one-to-many analysis the biometric system compares the presented biometric to an entire biometric database looking for a match. Though the two approaches have different methodologies, the analysis of the biometrics is basically performed in the same way. It is to be understood and appreciated that this disclosure describes one-to-many analyses, however the invention would apply equally to one-to-one analyses. In addition, the analysis component 414 can produce a list of pair-wise biometrics data comparisons that can be listed in ascending order, commonly referred to as the candidate list. If the number is above a pre-defined threshold then the analysis component 414 can determine that there is a match between the potential user and the authorized users in the storage component 412.

Furthermore, while not shown, redundant components/devices can be employed to protect against failure of the safety audit system 400. For instance, a single microcontroller can be employed in connection with the analysis component 414 and the sensor identification component 404. It may be desirable, however, to employ a second microcontroller that acts as a backup to the first microcontroller, wherein the first and second microcontrollers communicate with one another to ensure proper operation of such microcontrollers. If one of the microcontrollers malfunctions, the other microcontroller can be employed in connection with the analysis component 414 and the sensor identification component 404. Additionally, an alarm can be generated, an e-mail sent, a page dispatched, etc., notifying management and/or a supervisor of the safety audit system 400 that the microcontroller is to be replaced, for example.

The safety audit system 400 analysis component 414 can monitor electrical current and/or voltage from various programmable electronics (PE's) within the manufacturing system and determine when the performance of the PE's begin to degrade. The safety audit system 400 can determine that the MS is not operating in a manner to ensure the safety of an individual or machine and can recommend changing out PE components. Further, the analysis component 414 can determine when in the future controllers or sensors will begin to fail based on performance degradation, as well as recommending calendar maintenance with respect to the programmable electronics. For instance, if a sensor does not reach certain threshold performance measures, the analysis component 414 can predict when the sensor will fail and recommend scheduled maintenance as opposed to unanticipated failures. The safety audit system 400 can have the potential to ensure inherent safety and reliability levels and accomplish these goals at a minimum total cost, including maintenance costs and the cost of resulting failures.

The analysis component 414 can be associated with an alarm that notifies a manager relating to the time that the PE's are or will be operating below threshold performance levels. In addition, the analysis component 414 can employ sending a signal to the controller (not shown) which can inhibit continued operation of the controller until the fault condition is rectified. An alarm can be audible in nature, such as beeps that increase in volume and duration. Similarly, an alarm can be visible in nature such as blinking LED's, a strobe light, flashing lights, etc. In still another example, the safety system component 402 can generate e-mail messages, text messages, voice messages, and the like, and provide it to a manager of the safety audit system 400. It can thus be understood that any suitable manner of notifying the manager of an impending and/or predictive performance issue associated with the PE's is contemplated and intended to fall under the scope of the hereto-appended claims.

Figure 5:
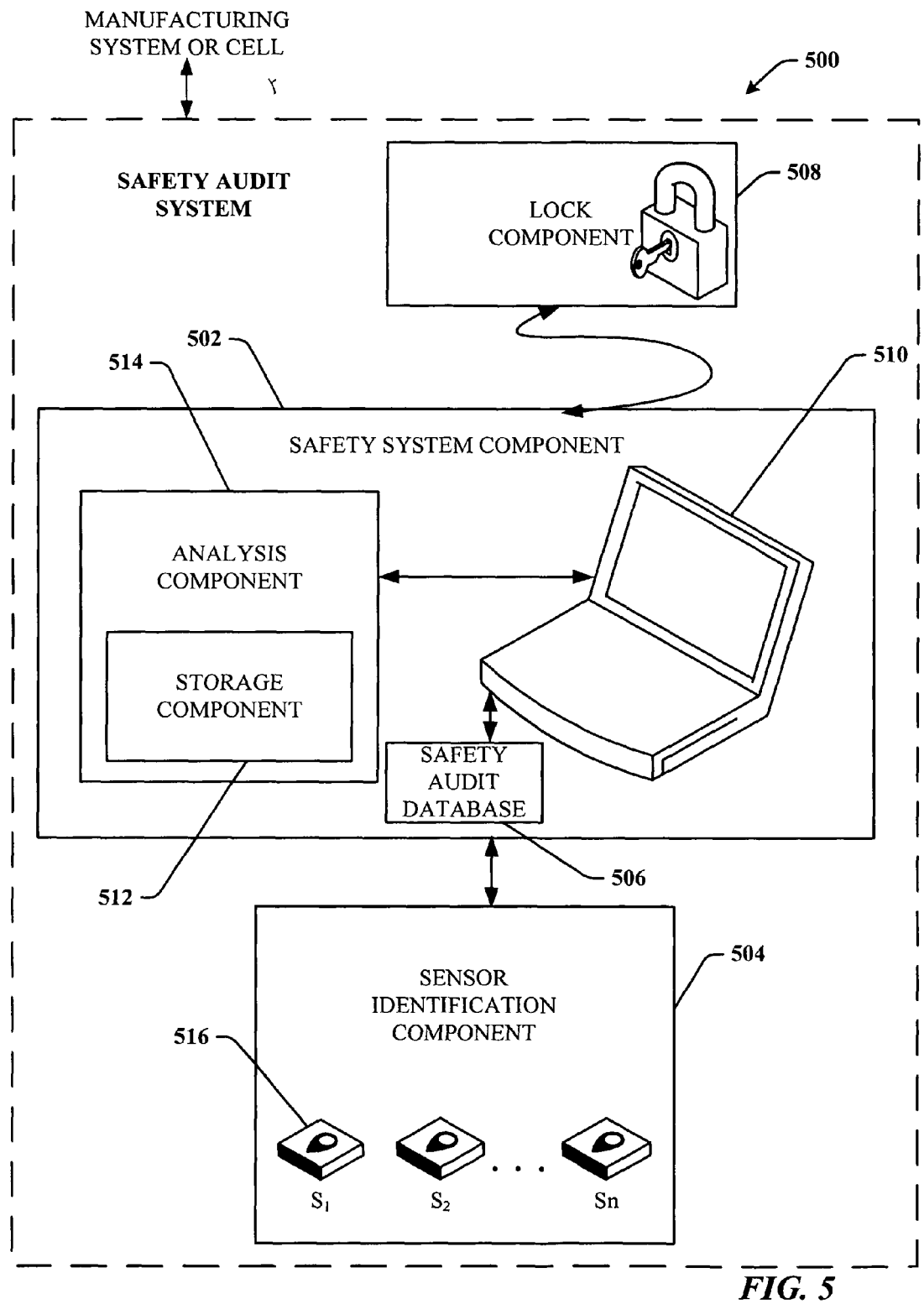
FIG. 5 illustrates a block diagram of an exemplary system that can be used to communicate between the safety system and multiple sensors in accordance with an aspect of the subject innovation.

Referring now to FIG. 5, a safety audit system 500 that can be employed in manufacturing or machine environments is illustrated to aid in recognizing users authorized to change the configuration of the manufacturing system. A safety system component 502 is typically made up of a computing component 510 that can be a computer, a human machine interface, a PDA, etc. For example, an analysis component 514 can be employed in connection with a storage component 512 and a safety audit database 506. More particularly, the analysis component 514 can match data received from the sensor identification component 504 with authorized users' data in the storage component 512, utilizing various algorithms and if it is determined that a match has occurred, the lock component can be de-activated to allow access to the MS, and any work performed on the manufacturing system can then be recorded in the safety audit database 506. The safety system component 502 can communicate with a lock component 508 to allow the user to change the configuration of the manufacturing system.

The sensor identification component 504 can be operatively connected to the safety system component 502, which can receive electrical transmissions that represent biometric sensor data, e.g., hard-wire or wirelessly. The system 500 can employ sensors 516 integrated in the sensor identification component 504 (including RFID, fingerprint, hand scan, iris scan, hand vein scan, voice recognition, retinal scan, DNA, signature, etc.). The sensor 516 for iris identification can be a camera, for fingerprints a scanner, for voice recognition a microphone, etc. The sensors 516 incorporated or employed within the sensor identification component 504 can be illustrated as $S_1$ to $S_n$, where n is an integer. The company can determine what sensor 516 or combination of sensors 516 are most suited to the application based on various factors (e.g., cost, reliability, accuracy, durability, environmental factors, power requirements, . . . ). The sensor identification component 504 can be designed so that additional sensor locations are available so that sensors 516 can be added over time.

In one example, the sensor 504 can contain an iris scan sensor 516 and a voice recognition sensor 516. The user tasked with changing the configuration of the manufacturing system can walk up to the sensor identification component 504, which directs the user to stand within a determined distance of the iris scan—sensor 516. The sensor 516 can read and record the user's iris data and convert that data to a digital or analog file, which can be transmitted to the computing component 510. Software (not shown) within the analysis component 514 can compare the user's data with electronic data, of authorized users, stored in the storage component 512. If a match is not found the user can be directed to repeat the process a predetermined number of times and with repeated failures, can be directed to a supervisor to correct or diagnose the problem. Assuming a match is found between the user's iris data and the authorized users' file, the user can then be directed to repeat a vocal phrase for the voice recognition—sensor 516. If the voice pattern analysis determines the user is an authorized user, the lock component 508 can electronically release a gate lock and the user can be allowed to enter the controlled access area and work on the manufacturing system. The MS can be in communication with the safety system component 502 computing device 510 and any changes in configuration can be recorded in the safety audit database 506 (changes in the configuration can include controller replacements, routine maintenance, software re-programming, etc.). If the user attempts to perform a function that is not authorized, the safety system component 502 can take steps to prevent the work from being done. In the event the user is not authorized to change software, the safety system component 502 can direct the MS to, e.g., prevent keyboard commands, not allow the user into the system to enter commands, ignore any commands that are entered, etc.

In yet another example, the plurality of the sensors 516 can be used to increase the likelihood of finding an authorized user match with the sensors 516 within the sensor identification component 504. For example, one of the sensors 516 could be a fingerprint recognition—sensor 516, a second a hand vein scan—sensor 516 and a third a face recognition—sensor 516. The user that needs to work on the manufacturing cell can be directed in front of a light curtain (not shown) to place a finger on the fingerprint sensor. If the sensor 516 in conjunction with the safety system component 502 fail to recognize the user as an authorized user (e.g., a malfunctioning sensor, an injury to the user's finger, corrupted stored data etc.) the system 500 can then direct the user to the hand vein scan sensor that can recognize the user as authorized to work on the MS. The safety system component 502 can power down the MS after determining it is safe to do so and then shut off the light curtain to allow the authorized user access the a section of the MS. As such, the safety audit system 500 can provide additional flexibility in allowing user's access, and supply a prompt response in addressing faulty sensors. The authorized users can also be prompted to provide biometric data upon completion of changes performed on the manufacturing system. Upon the user exiting the system the lock component 508 can re-activate to deny access to unauthorized users.

The safety audit system 500 can automatically track information associated with users that are working on the system. The safety audit system 500 can further employ the safety audit database 506 to determine what changes were made to the MS, by whom, and the mistakes that were made, for example. The safety data can all be stored in a single database automatically. Furthermore and in general, the safety audit system 500 does not need to gather documents together in the event of an incident or accident. A centrally located safety audit database 506 can mitigate complexity, paper storage needs, inaccuracy, unscheduled maintenance and associated costs. Furthermore, changes to the MS can be logged in the safety system component 502 so that the changes and/or data is typically only available to the supplier and/or manufacturer of the equipment. This logged data can be available to the equipment supplier in the event that the user alters the visible audit safety database 506, e.g., after an accident.

Figure 6:
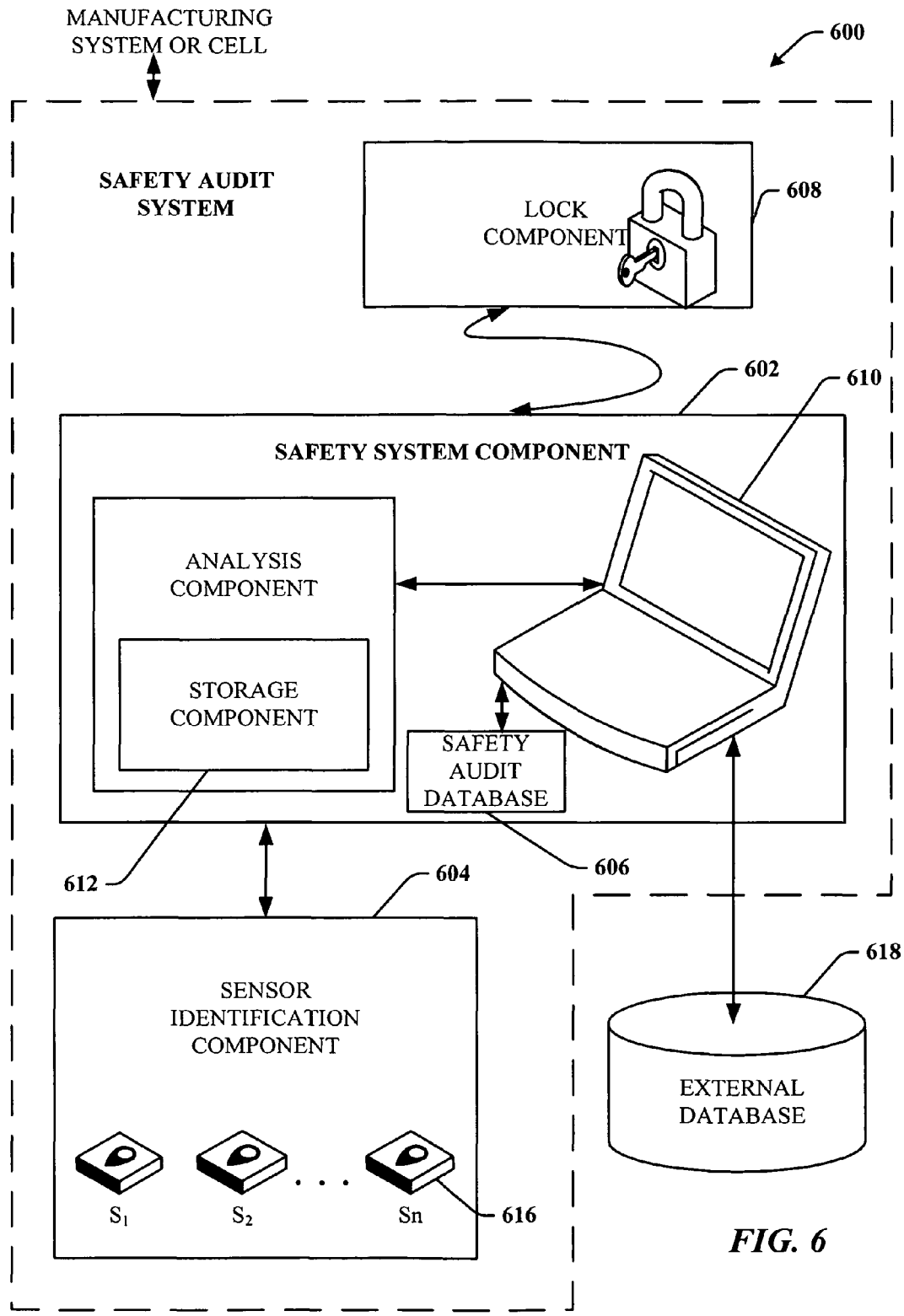
FIG. 6 illustrates a block diagram of an exemplary system that facilitates communicating between a safety system and an external database.

Turning now to FIG. 6, yet another safety audit system 600 is illustrated according to the subject innovation. The safety audit system 600 can employ an external database 618, which stores authorized users' sensor data in association with the safety audit database. The external database 618 can further consist of multiple databases that are networked together, which act as memory backup, for example. It is also to be understood that the external databases 618 can be optional in the safety audit system 600, and the storage component 604 within the safety system component 612 can be sized employing sufficient memory to meet the manufacturing system needs for maintaining a safety audit database 606.

Both the safety audit database 606 and the external database 618 can store data in data structures including, but not limited to one or more lists, arrays, tables, databases, stacks, heaps, linked lists and data cubes. A computational component 610 can connect to the external database 618 using e.g., a hard-wire network connection, a cable modem, USB (Universal Serial Bus), FireWire, RS-232, etc.

Figure 7:
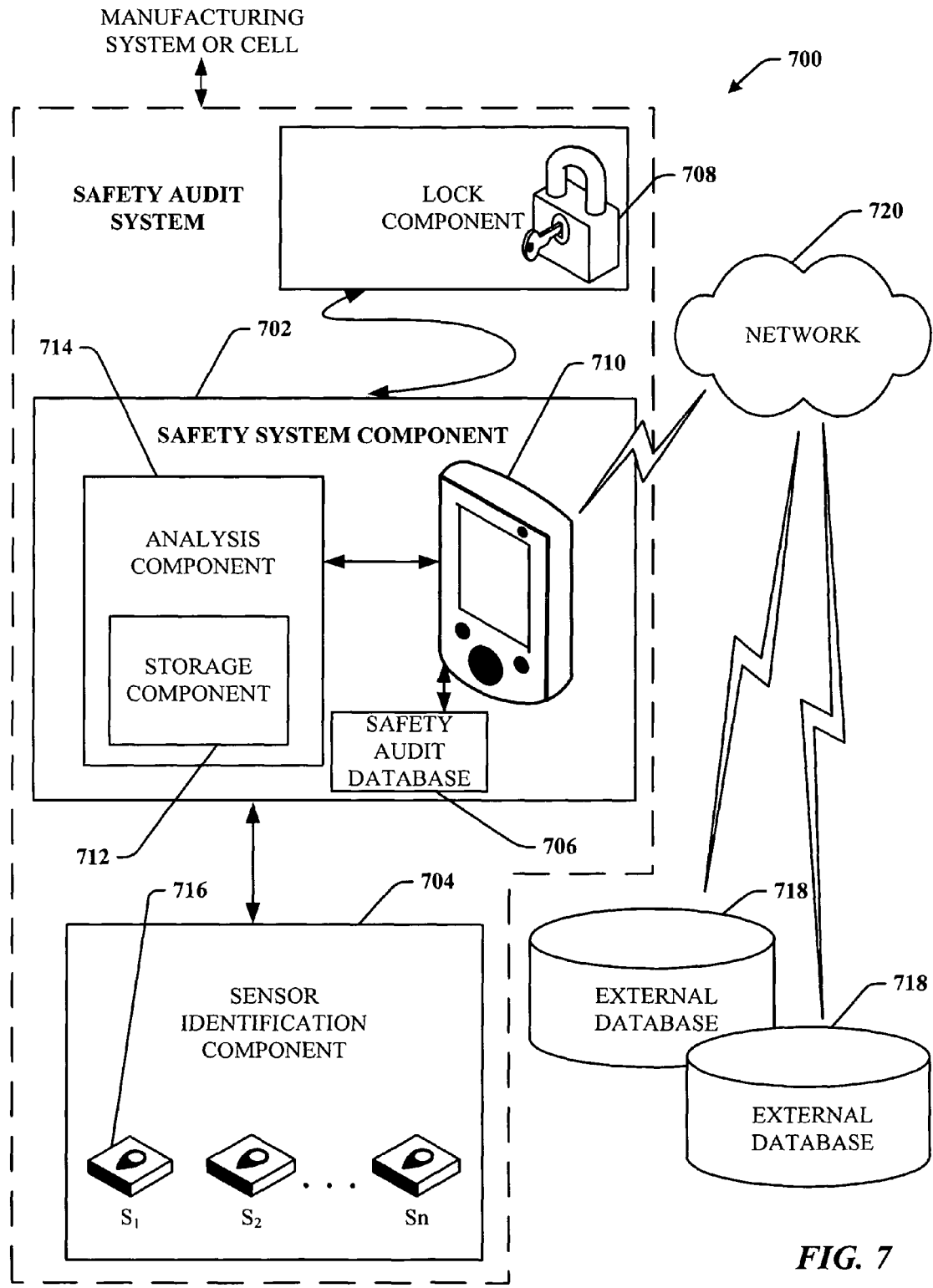
FIG. 7 is a block diagram that illustrates wireless communication between a safety system, a network and an external database in accordance with at least one embodiment of the claimed subject matter.

FIG. 7 illustrates a safety audit system 700 that facilitates wireless communication of MS data to an external database. A safety system component 702 can employ a safety audit database 706 stored within a computing component 710 that contains an analysis component 714 that can interact with a storage component 712 that facilitates storage of an authorized users' database (not shown). It is to be appreciated that the computing component 710 can be a laptop computer, a PDA, cellular automata, programmable computing devices (PCA), mobile phones, etc. The safety system component 702 can be any suitable device associated with a manufacturing system and/or process, wherein the safety system component 702 can communicate with the manufacturing system. In one example, the analysis component 714 can compare data obtained from sensors 716 within a sensor identification component 704 with authorized users' data in an external database 718.

The analysis component 714 can examine data associated with a sensor identification component 704 and/or the manufacturing system and can retain the desired data in a safety audit database 706 internal to the safety system component 702 or in the external database 718. The computational device 710 can communicate with the external database 718 wirelessly through a network 720. The computational device 710 can receive data from any of a variety of sources, mediums and communications protocols such as, the Internet, a hard-wire network connection, wireless, infra-red, Blue-tooth, ultra-wide band, satellite. The storage component 712 that resides in the analysis component 714 can store authorized users' sensor data. A user attempting to gain access to the MS to change the configuration can gain access to the system by providing biometric data, utilizing a sensor identification component 704, with the biometric(s) read by sensor(s) 716. If the user's biometric data matches the data of an authorized user stored in the storage component 712 or the external database 718 a lock component 708 allows access to the manufacturing system.

Figure 8:
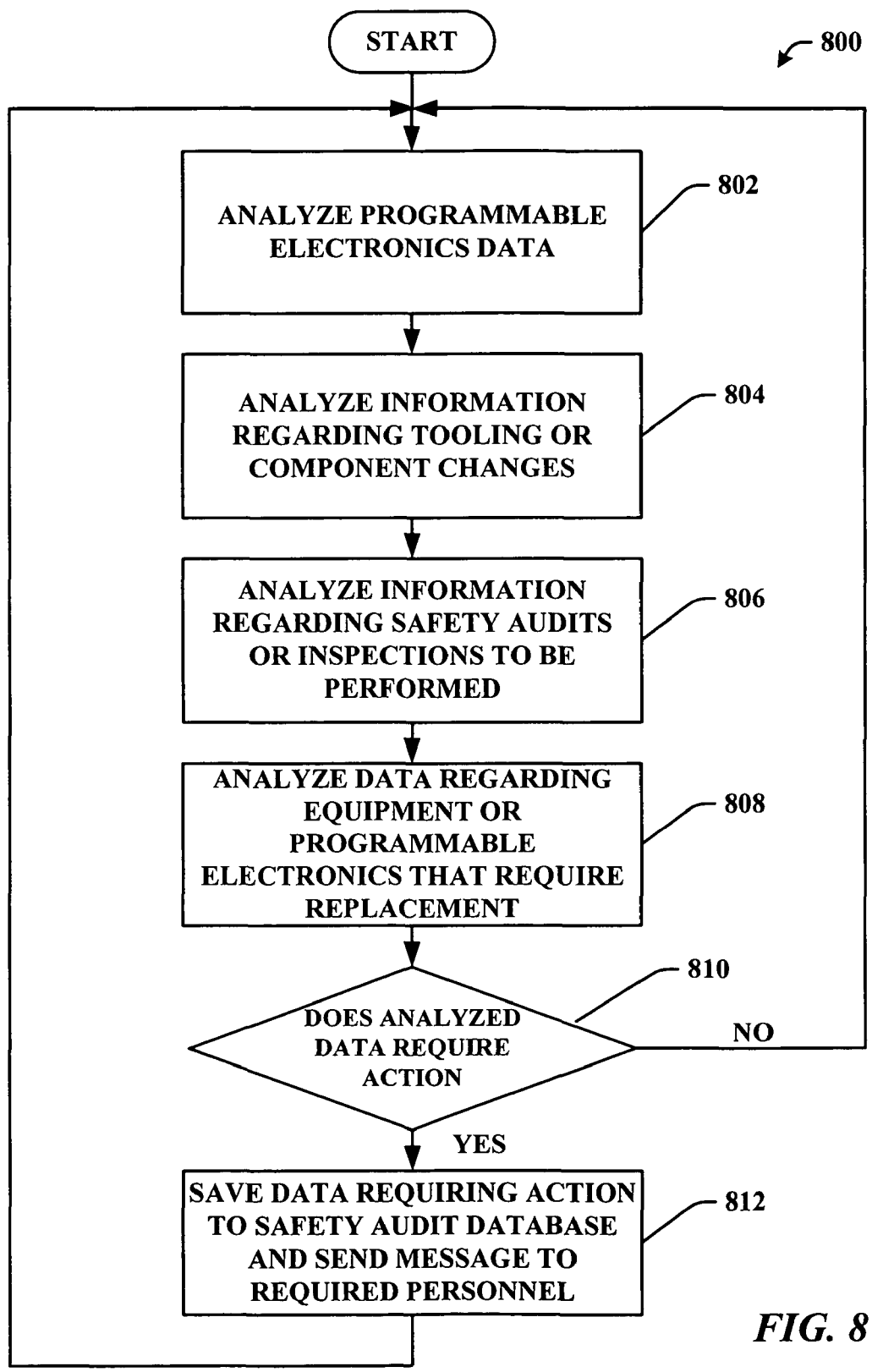
FIG. 8 illustrates an exemplary methodology that facilitates acquiring and determining if data needs to be stored to a digital file.
Figure 9:
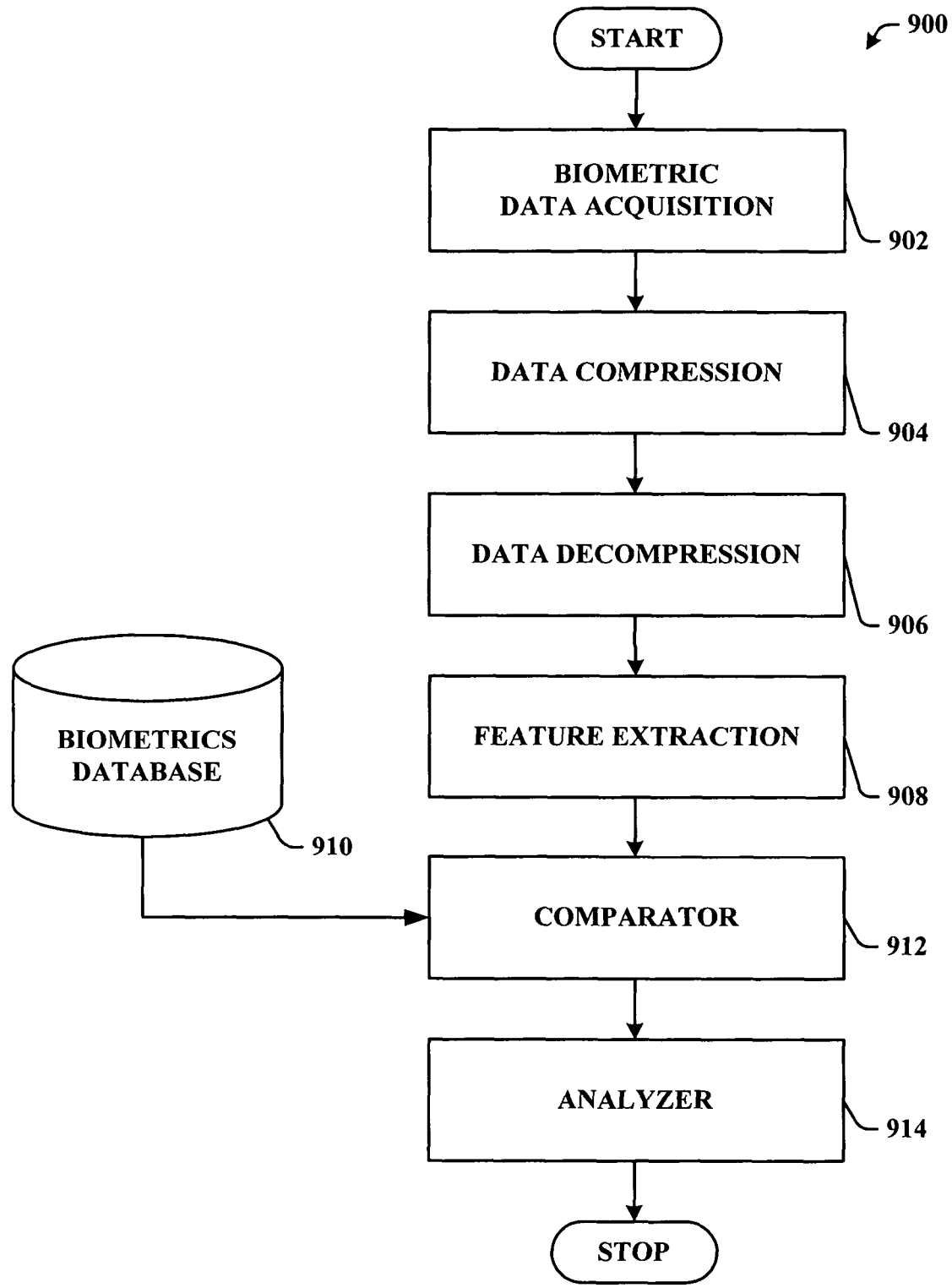
FIG. 9 illustrates an exemplary methodology of user verification to enable changing a manufacturing system configuration.
Figure 10:
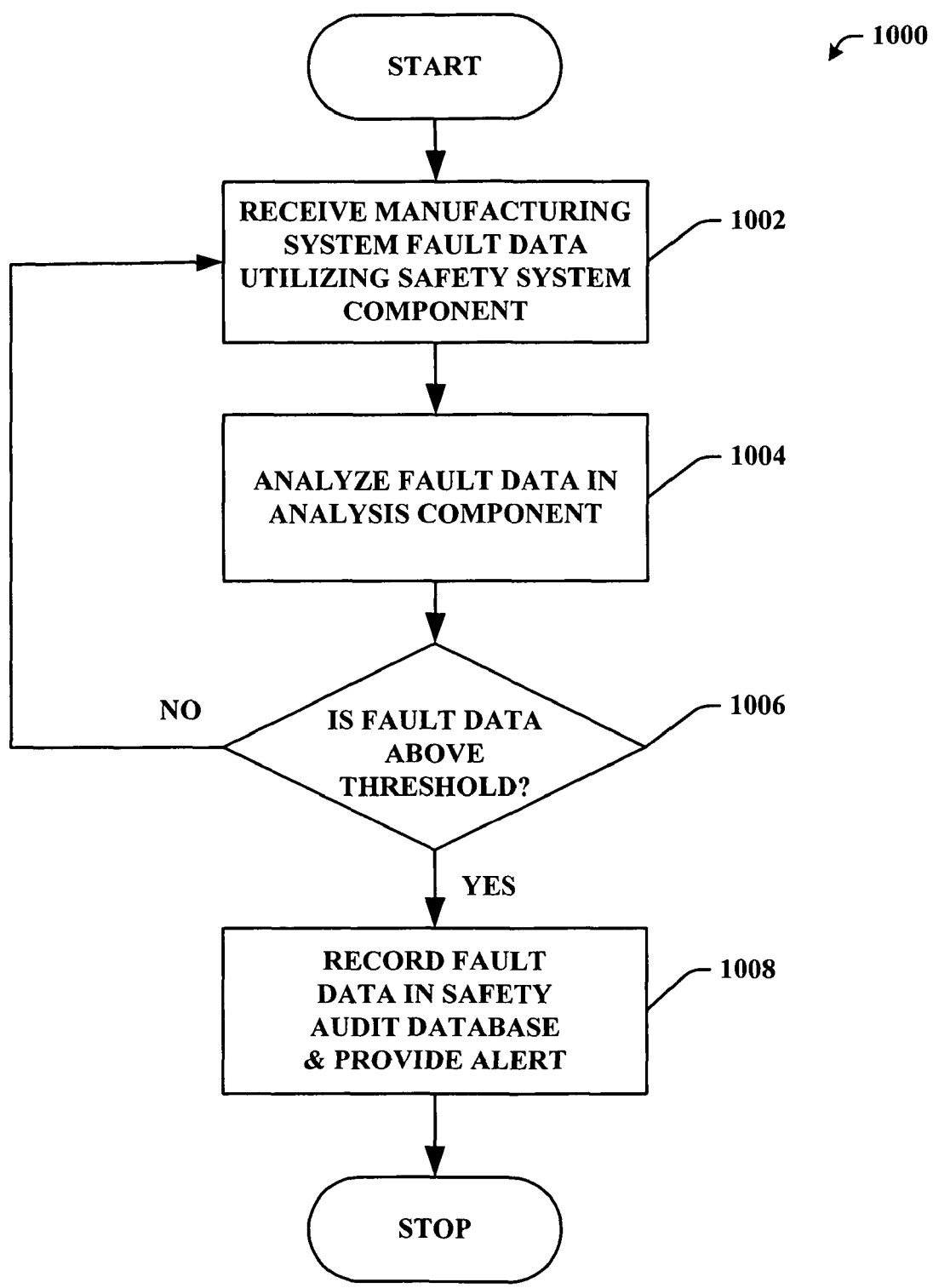
FIG. 10 illustrates an exemplary methodology for analyzing fault data that can be employed in accordance with a further aspect of the subject innovation.

FIGS. 8-10 illustrate methodologies in accordance with various aspects of the subject innovation. While, for purposes of simplicity of explanation, the methodologies are shown and described as a series of acts, it is to be understood and appreciated that the subject innovation is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology of sampling and analyzing various data in accordance with an aspect of the subject innovation. At 802, a PE data subset for the programmable electronics can be obtained and analyzed. The PE data subset can be a variety of information including, but not limited to, sensors with degraded performance, controllers requiring replacement, microprocessor data, voltages within tolerance or other electronic components that are working within specification. A change data subset for tooling and component changes can be acquired and analyzed at 804 to check for tooling and component changes, which can include welding arms, motors, safety switches, versions of software, etc. The change data subset records all of the hardware that was changed out since the last configuration change was recorded in the safety audit database and therefore the safety system can keep track of the hardware changes that were made. In the event that the safety audit database does not recognize the changed out component the user is instructed to record the change in an information record regarding the component. The information record can include a part name, a serial number, a company name, the user's name, the date of the replacement, etc.

At 806, an audit data subset can be collected and analyzed based on audits or safety inspections that need to be performed. The subset of data may be required based on statutory requirements, safety standards, company requirements, etc. The audit data subset can include e.g., a quarterly safety audit that in general must be performed in order to meet a standard, monthly maintenance that must typically be performed within a given time limit, a list of components that have to be changed out ever ninety days and recorded, etc. At 808, an "out of tolerance" data subset can be collected and analyzed based on equipment and programmable electronics that require replacement. At 810, a determination can be made if any data from all of the subsets of data require action to be taken by the safety audit system. If the data requires action, the data can be stored to the safety audit database 812. The amount and type of the data can be a function of any of a number of metrics. For example, the data can be all of the data needed for a safety audit, degrading components and a predicted time for when the components will fail, tools that have been changed out, faults that have been recorded for sensors, etc. The data can be stored automatically but if required necessary data can be entered manually. In the event that data requires manual entry, the safety audit system can remind appropriate personnel (including but not limited to floor supervisors, MS supervisors and managers) that the data needs to be captured, when and by whom the data was entered, for example. The data can be stored based on content, the size of the data, relevance of the data to the company's expected needs, priority of the data, cost of the data, security risks, likelihood of future use, utility of the data, etc.

Turning specifically to FIG. 9, a particular methodology 900 for identifying an authorized user is illustrated. The methodology 900 starts at 902, where biometric data for the user attempting to gain access to the manufacturing system or machine can be acquired in digital form utilizing a sensor. At 904 and 906 the biometric data can be compressed and decompressed in order to minimize the data stored in a database and to meet the transmission requirements of the system. For instance, the data can be configured in the form of a digital file of the user's biometric. At 908, a feature extraction algorithm can be employed to produce feature vectors that represent the biometric. The feature vectors for a given individual are then stored in a biometrics database.

Generally, the larger the size of the feature vector the more data representing a biometric and the better the comparison between two biometrics. For example, a voice feature vector can be a user's voice stored as a digital file where each spoken word can be converted to segments composed of dominant frequencies and the segments can be made up of tones that are stored in a digital format. At 912 feature vectors of authorized users from the biometrics database 910 can be compared to the feature vector of the user. For example, at 912 a comparator can receive authorized users' biometric features from one of a plurality of biometric databases. In another example, authorized users' features can be sorted based on probabilities and a small percentage of authorized users (AU) can be compared at a given time to optimize finding a match. In yet another example, artificial intelligence can be employed to optimize the amount of data stored and the time to find a match between the user and the AU. Thus, any suitable arrangement that enables the feature vector of the user attempting to gain access to the MS with the authorized users' biometrics database can be contemplated by the inventors and intended to fall under the scope of the hereto-appended claims. At 914, biometric features vector comparisons can be analyzed to determine if the user attempting to gain access to the MS can be one of the authorized users within the biometrics database. For instance, the analyzer can determine if a similarity score can be acceptable, which can direct this information to a display, a gate lock release, a green light, etc. The methodology 900 completes at 914.

Figure 11:
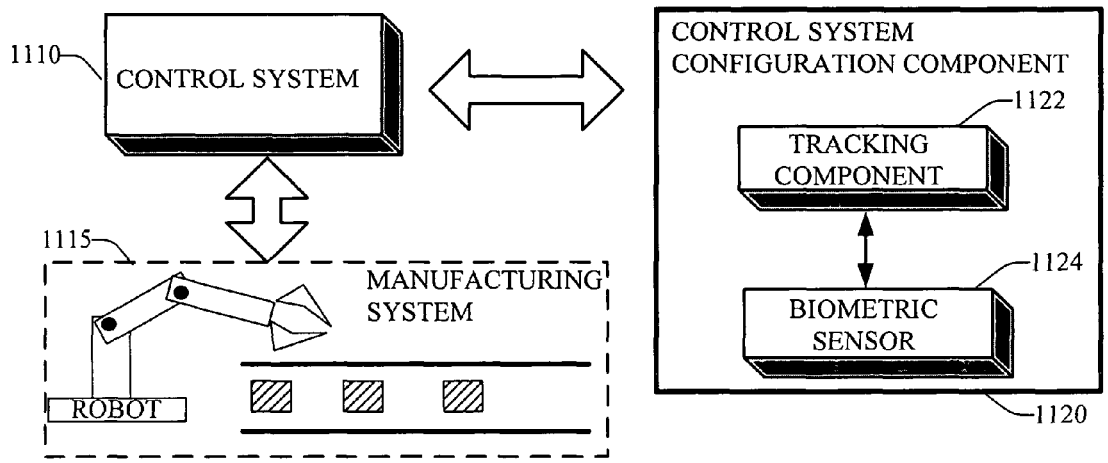
FIG. 11 illustrates an exemplary control system configuration component that configures a control system in accordance with an aspect of the subject innovation.

Turning to FIG. 10 a method can be illustrated for identifying and reporting faults encountered in the manufacturing system. At 1002, a safety audit system obtains manufacturing system (MS) fault data. The MS fault data can include failed sensors, corrupt software, incorrect component installation, missing safety switches, etc. At 1004 the fault data can be analyzed to determine an importance level for each of the faults. The faults for example, can be assigned values that correlate to the faults impact on safety based on the other reported faults. At 1006 a decision can be made to determine if the faults are above given threshold values. If the fault data is above a threshold the fault is recorded at 1008 in a safety audit database and alerts can be issued. For example, the safety audit system can send e-mails, faxes, text messages, pages, etc., to supervisors that faults exist in the manufacturing system that have to be addressed and recorded. FIG. 11 illustrates a particular block diagram of an exemplary control system configuration component 1120 that can configure a control system 1110 that controls a manufacturing system 1115 in accordance with an aspect of the subject innovation. The control system configuration 1120 can track configuration changes to the manufacturing system 1115, via the tracking component 1122. Such tracking component 1122 can track data such as: a users' certifications, type of configurations a user is permitted to modify on the manufacturing system, 1115 and the like. The control system configuration component 1120 can further include a biometric sensor 1124 that as described in detail infra can collect and verify identifying indicia of a user.

Figure 12:
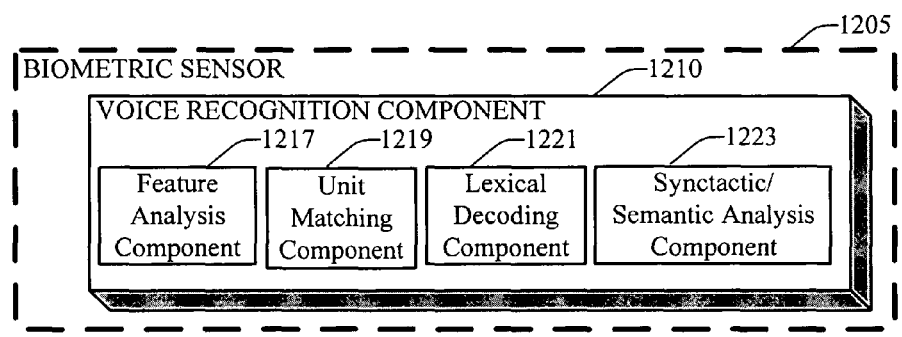
FIGS. 12-13 illustrate particular aspects of a biometric sensor that employs a voice recognition component to configure a manufacturing system in accordance with an aspect of the subject innovation.

In one particular aspect, the biometric sensor 1124 can include a voice recognition component. FIG. 12 illustrates a biometric sensor 1205 with a voice recognition component 1210 in accordance with an aspect of the subject innovation. The voice recognition component 1210 can apply models such as Markov models, Dynamic Time Warping (DTW) and neural-net microprocessors, and the like to recognition of speech. In general, Markov models can be based on a mathematical structure that forms the theoretical basis for a wide range of applications. When Markov models are applied to speech recognition, the models are referred to as the Hidden Markov Models (HMM) to include the case where the observation is a probabilistic function of the state. Such Hidden Markov Models employed in speech recognition are characterized by a process that provides evaluation of the probability or likelihood of a sequence of speech sounds. Typically, a speech recognition component 1210 that employs HMM can include a feature analysis component 1217 that provides observation vectors used for training the HMMs that characterize various speech sounds. A unit-matching component 1219 can provide the likelihood of a match of all sequences of speech recognition units to an unknown input speech sound.

Moreover, a lexical decoding component 1221 can place constraints on the unit-matching component 1219 so that the paths investigated are those corresponding to sequences of speech sounds that are in a word dictionary or other predetermined word listing, for example. Syntactic and semantic analysis component 1223 can further constrain the paths investigated to provide higher performance of the speech recognition system.

Figure 13:
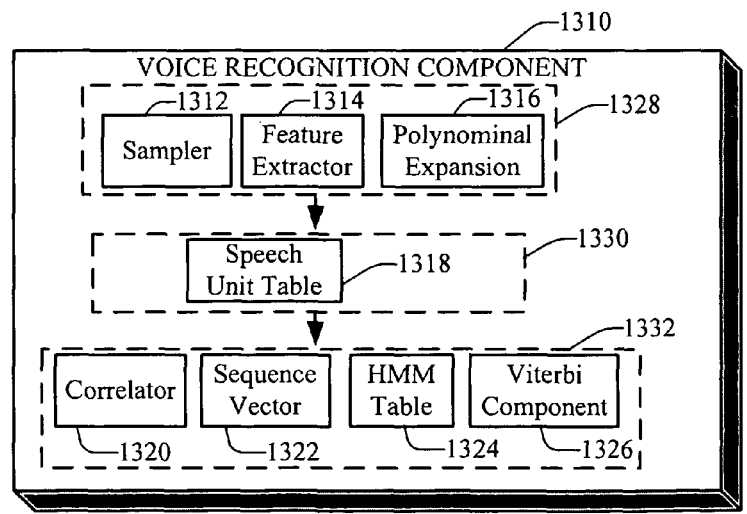

FIG. 13 illustrates a particular voice recognition system 1310 that can be implemented as part of the biometric sensor in accordance with an aspect of the subject innovation. Such voice recognition system 1310 can consist of three basic sections. The first section is an extraction section 1328 that has an input for receiving an input speech, a sequence of speech sounds, or a signal into a speech sampler component 1312. The input speech can be selected from a large uniform database of speech with a wide range of words and speech segments of users authorized to configure the manufacturing system. The output data of sampler component 1312 can be transferred to a feature extractor component 1314 that can extract time domain and spectral domain parameters from the spoken input speech into a feature vector. Such feature vectors typically consist of cepstral, delta cepstral, linear prediction coefficients, energy and magnitudes, and the like. The feature vectors from feature extractor component 1314 can be expanded by a polynomial expansion component 1316 into high order polynomials, typically a $4^{th}$ order polynomial.

The second section is a building block section 1330 having a speech unit table 1318 that creates a set of speech building blocks. Such speech building blocks can be employed to construct any word in a spoken language. The third section is an HMM section 1332 that performs a Hidden Markov Model statistical analysis of the feature vector sequence that can be employed for selection of the spoken word. HMM section 1332 can further include a correlator component 1320 that correlates each vector in the current word derived from the speech input received by sampler component 1312 with every speech segment vector stored in speech unit table 1318. Thus, correlator component 1320 compares the expanded $4^{th}$ order polynomials from polynomial expansion component 1316 against the $4^{th}$ order polynomial representation speech segments received from speech unit table 1318. A best match is determined for each input speech and the results of the comparison are passed to a sequence vector component 1322. It is to be appreciated that other order polynominals can also be compared by the correlator component 1320.

For a particular HMM, the Viterbi algorithm can be employed to find the most probable sequence of hidden states given a sequence of observed states. A Viterbi component 1326 receives inputs from sequence vector 1322 and HMM table 1324. HMM table 1324 can consist of three matrices for each word in the vocabulary, e.g. Initial State, State Transition, and Observation Probability Density Distribution. The Initial State matrix is a list of probabilities for starting in each of the possible states. The State Transition matrix lists the probabilities of transitioning from any given state to all possible states. The Observation Probability Density Distribution matrix lists the probabilities of any given speech unit being observed from any given state. Viterbi component 1326 can provide an output that represents the single best state sequence or path to maximize the probability of having reached the desired state.

Figure 14:
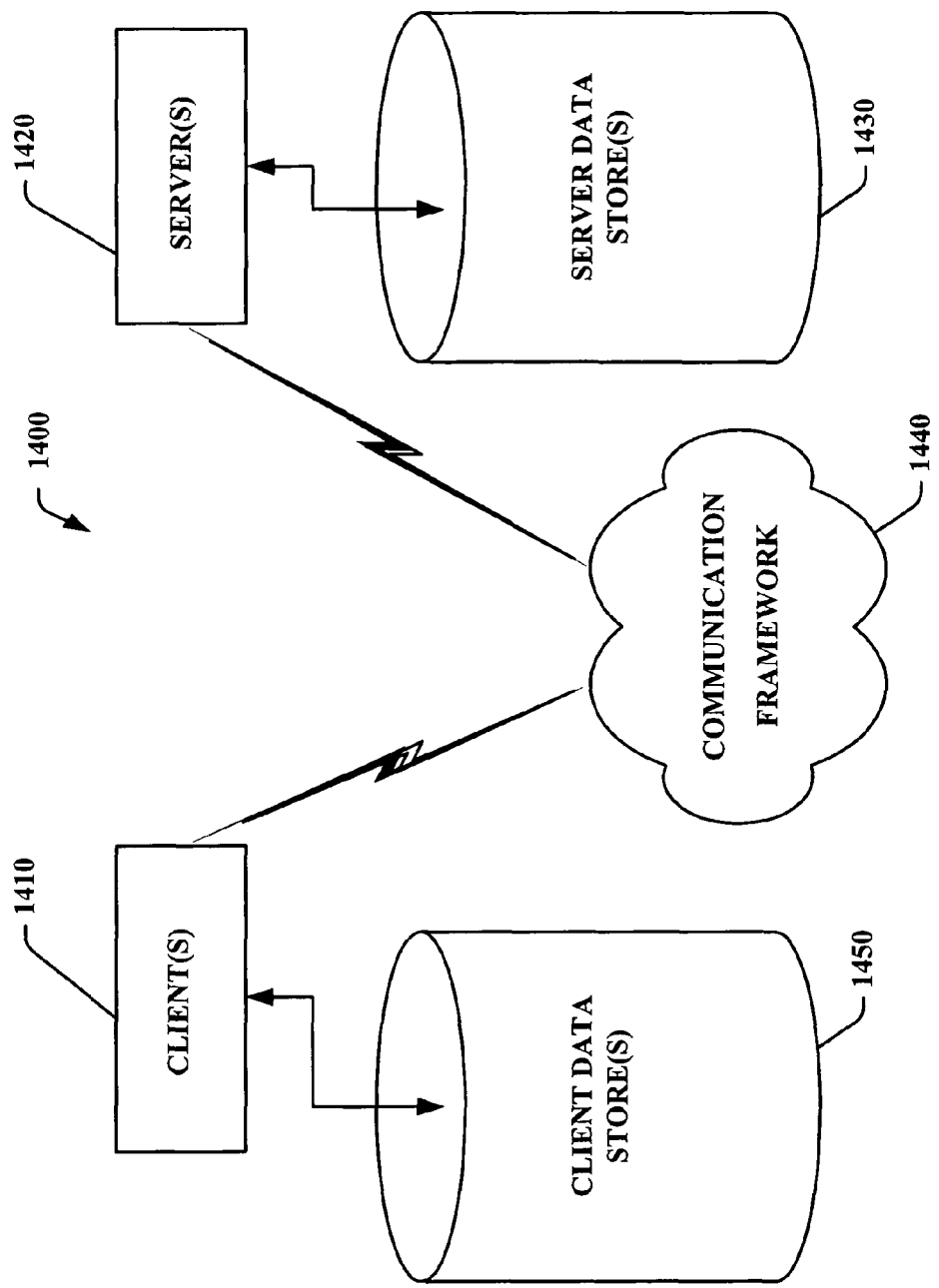
FIG. 14 illustrates an exemplary networking environment suitable for implementing various aspects of the subject innovation.

FIG. 14 can be a schematic block diagram of a sample-computing environment 1400, wherein the subject innovation can be implemented. The system 1400 includes one or more client(s) 1410. The client(s) 1410 can be hardware and/or software (e.g., threads, processes, computing devices). The system 1400 also includes one or more server(s) 1420. The server(s) 1420 can be hardware and/or software (e.g., threads, processes, computing devices) and can house threads to perform transformations by employing the subject innovation, for example.

One possible communication between a client 1410 and a server 1420 can be in the form of a data packet which can be adapted to transmit between two or more computer processes. The system 1400 includes a communication framework 1440 that can be employed to facilitate communications between the client 1410 and the server(s) 1420. The client(s) 1410 can be operably connected to one or more client data store(s) 1450 that can be employed to store information local to the client(s) server 1410. Similarly, the server(s) 1420 can be operably connected to one or more server data store(s) 1430 that can be employed to pre-store information local to the servers 1420.

Figure 15:
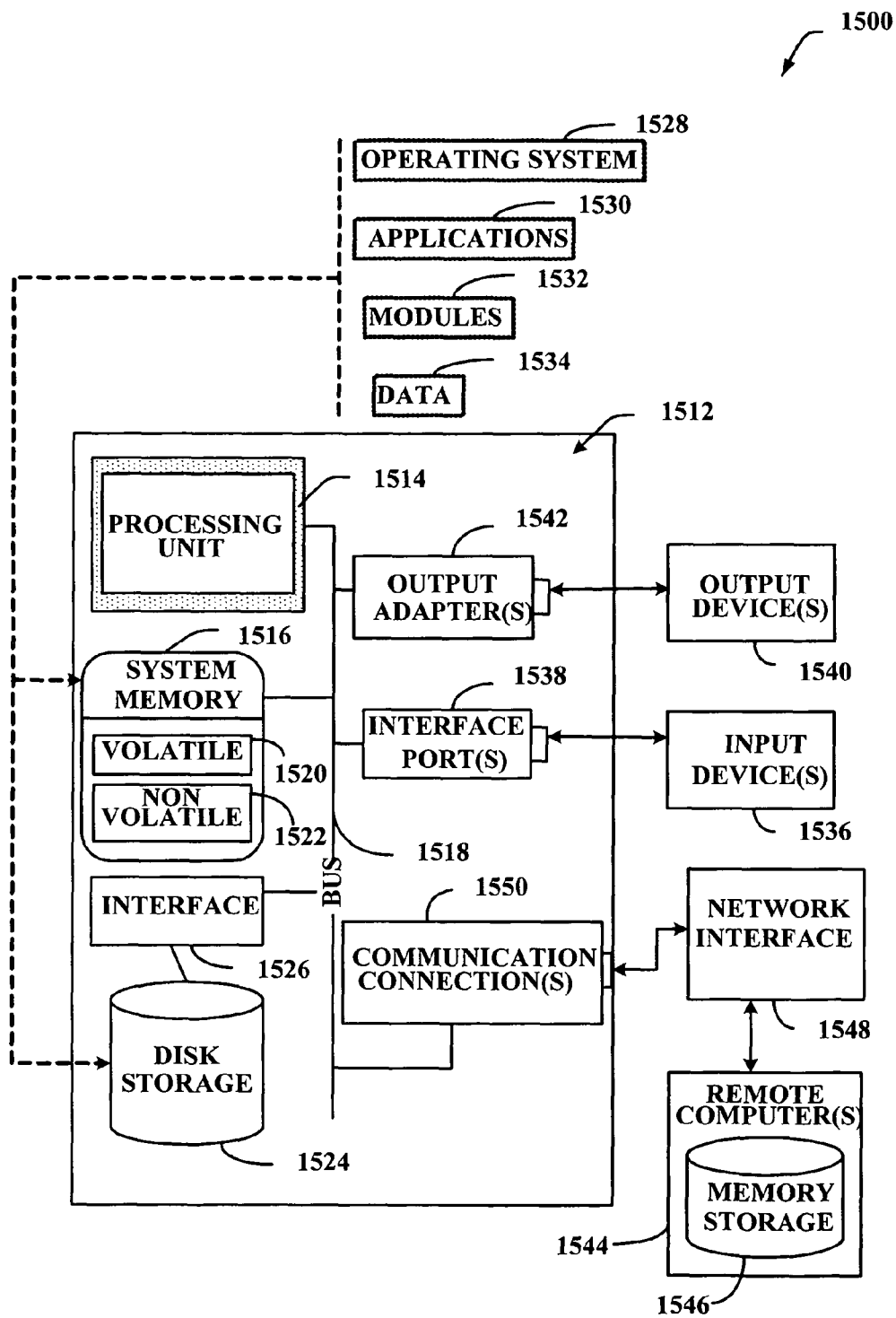
FIG. 15 illustrates an exemplary operating environment that the subject innovation can interact.

With reference to FIG. 15, an exemplary environment 1500 for implementing various aspects of the subject innovation includes a computer 1512. The computer 1512 includes a processing unit 1514, a system memory 16, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1294), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, can be stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface can be typically used such as interface 1526.

It is to be appreciated that FIG. 15 describes software that acts as an intermediary between users and the basic computer resources described in the suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the claimed subject matter can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to output information from computer 1512 to an output device 1540. Output adapter 1542 is provided to illustrate that there are some output devices 1540 like monitors, speakers, and printers, among other output devices 1540, which employ special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A safety audit system, comprising:
a sensor identification component comprising at least one sensor that detects a configuration change to a manufacturing system and at least one biometric sensor that senses identifying biometric data for a user of the manufacturing system that makes the configuration change;
a lock component that determines whether the configuration change is authorized based at least in part upon the identifying biometric data; and
a safety system component that automatically records the configuration change and the identifying biometric data in a safety audit database based at least in part on a safety audit requirement of the manufacturing system,
wherein the safety audit database comprises a public portion that is accessible as a history of the configuration change and a private portion implemented at a time of manufacture of the manufacturing system that logs the history of the configuration change and is accessible only to an third party associated with supplying the manufacturing system in the event of an accident, and
wherein the safety system component shuts down the manufacturing system in response to the configuration change being unauthorized.

2. The system of claim 1, further comprising an analysis component that evaluates manufacturing system data with probabilistic anticipated data to determine a manufacturing system fault.

3. The system of claim 1, the biometric sensor is capable of performing at least one of: fingerprint scan, voice recognition, deoxyribonucleic acid (DNA) matching, retinal scan, hand geometry analysis, iris scan, optical tissue scan, hair analysis, face recognition, vein scan, gait pattern analysis, lip movement analysis, hand signature analysis, or analysis of typing keystroke dynamics.

4. The system of claim 1, further comprising an external database that stores the safety audit database and the identifying biometric data.

5. The system of claim 1, wherein the safety system component stores an initial setup of the manufacturing system.

6. The system of claim 1, wherein the configuration change comprises at least one of a software version change, an inspection, a maintenance action, or a tool change.

7. The system of claim 1, wherein the safety system component is configured to alert management in response to the user not being authorized to make the configuration change.

8. The system of claim 7, wherein the safety system component is configured to alert management by email.

9. The system of claim 7, wherein the safety system component is configured to alert management by an alarm.

10. A method of tracking configuration changes made to a manufacturing system, comprising:
employing a first sensor to detect a modification of a configuration of a device within the manufacturing system;
employing a second sensor to determine an identity of a user of the manufacturing system making the modification, wherein the second sensor is a biometric sensor;
matching the identity of the user to a list of authorized users in a safety audit database and determining that the user is authorized to make the modification based upon the identity;
permitting the modification to the device;
automatically recording the identity of the user and the modification to the device to a public portion of the safety audit database based at least in part upon a safety audit requirement of the manufacturing system, wherein the public portion of the security audit database is accessible to the user as a history of the configuration change; and
automatically recording the identity of the user and the modification to the device to a private portion of the safety audit database, wherein the private portion is implemented at a time of manufacture of the manufacturing system and is accessible only to a third party associated with supplying the manufacturing system in the event of an accident.

11. The method of claim 10, further comprising alerting management in response to the user not being authorized to make the modification.

12. The method of claim 10, wherein the automatically recording further comprises automatically recording at least one of the date of the modification or a type of the modification.

13. The method of claim 10, wherein the automatically recording further comprises automatically recording at least one of a tool position, a robot arm velocity, a temperature, information representative of a tool replacement, or an assembly speed.

14. The method of claim 10, wherein the matching further comprises matching the identity of the user to the list of authorized users based at least in part upon one or more certifications related to a process associated with the machine.

15. The method of claim 14, wherein the matching further comprises reminding the user that recertification is due.

16. The method of claim 10, wherein the matching further comprises matching the identity of the user to the list of authorized users based at least in part upon an area of the manufacturing system.

17. A non-transitory computer readable storage medium having stored thereon computer-executable instructions that, in response to execution, cause a computing system to perform operations, comprising:
employing a first sensor to detect a modification of a configuration of a device within the manufacturing system;
employing a second sensor to determine an identity of a user of the manufacturing system making the modification, wherein the second sensor is a biometric sensor;
matching the identity of the user to a list of authorized users in a safety audit database and determining that the user is authorized to make the modification based upon the identity;
permitting the modification to the device;
automatically recording the identity of the user and the modification to the device to a public portion of the safety audit database based at least in part upon a safety audit requirement of the manufacturing system, wherein the public portion of the security audit database is accessible to the user as a history of the configuration change; and
automatically recording the identity of the user and the modification to the device to a private portion of the safety audit database, wherein the private portion is implemented at a time of manufacture of the manufacturing system and is accessible only to a third party associated with supplying the manufacturing system in the event of an accident.

* * * * *